United States Patent

[11] 3,609,702

[72] Inventors Peter A. E. Gardner
Winchester;
Michael H. Hallett, Chandlers Ford; Peter
J. Titman, Winchester, all of England

[21] Appl. No. 825,455
[22] Filed Oct. 23, 1968
[45] Patented Sept. 28, 1971
[73] Assignee International Bushiness Machines
Corporation
Armonk, N.Y.

[54] ASSOCIATIVE MEMORY
8 Claims, 5 Drawing Figs.

[52] U.S. Cl. .......... 340/172.5, 340/173 AM
[51] Int. Cl. .......... G11c 15/00
[50] Field of Search .......... 340/172.5, 173, 174; 235/157

[56] References Cited

UNITED STATES PATENTS

| | | | |
|---|---|---|---|
| 3,264,616 | 8/1966 | Lindquist | 340/172.5 |
| 3,290,659 | 12/1966 | Fuller et al. | 340/172.5 |
| 3,299,409 | 1/1967 | Herman | 340/172.5 |
| 3,328,769 | 6/1967 | Lee | 340/172.5 |
| 3,350,698 | 10/1967 | Pritchard | 340/172.5 |
| 3,391,390 | 7/1968 | Crane et al. | 340/172.5 |

*Primary Examiner*—Paul J. Henon
*Assistant Examiner*—Sydney Chirlin
*Attorneys*—Hanifin and Jancin and William S. Robertson

ABSTRACT: This invention relates to an associative memory for the storage of digital data in which each word location of the memory is provided with two or more match triggers. Mans is provided for registering matches or mismatches in a selected trigger and for controlling operations on the memory in response to the contents of a selected trigger. Several operations are described which use the plural triggers.

INVENTORS
PETER A.E. GARDNER
MICHAEL H. HALLETT
PETER J. TITMAN

BY W. D. Roberts [signature]

ATTORNEY

ASSOCIATIVE MEMORY

INTRODUCTION

In an associative memory, as distinguished from a conventional nonassociative memory, a data word is accessed by specifying at least part of the content of the word. By contrast, in a conventional memory a data word is accessed by specifying the storage location at which the word is to be found. If, for example, the words in an associative memory comprise account numbers and credit balances, the word containing a balance to be updated can be retrieved by specifying the account number of that balance. Alternatively, assuming that balances are given positive or negative signs, by specifying a negative sign all data words relating to accounts which have negative balances can be retrieved. For convenience, the data, such as the account number or negative sign, which is used to identify a word to be retrieved will be referred to as the tag.

In the usual form of associative memory the tag is placed in the bit positions of an input register corresponding to the bit positions of the tag in the data words in the memory and tag and the data words are compared. A mark register is used to enable the comparison to take place only between specified bit positions of the input register and data. Those data words in which the corresponding bit positions match the tag are marked and are subsequently read out to an output register.

Words selected for readout are commonly marked by setting to a predetermined stable state a bistable device (a match trigger) associated with the storage location containing a selected word. The setting of this device is subsequently used to control the application of a read or write signal to the storage location. In the known prior art, only one such trigger has been provided.

THE INVENTION

The associative memory of this invention conventionally includes a multiordered input register and a plurality of multiordered data word locations, comparison means for comparing the data content of one or more orders of the input register with the data content of the same orders of each of the word locations, each word location being adapted to generate a respective match signal when the compared data in the location matches the compared data in the input register. The associative memory of this invention includes for each word location a plurality of bistable match triggers, wherein selection means are provided to set a selected one of the triggers to a predetermined stable state in response to the generation of a match signal.

In a preferred embodiment of the invention two match triggers are provided called respectively primary and secondary triggers.

This facility has been found particularly useful in the processing of lists of data words such as instructions. For example, accessing of instruction words belonging to the main program may be controlled by the settings of the primary triggers and accessing of instruction words belonging to subroutines maybe controlled by the settings of secondary triggers.

The foregoing and other objects, features and advantages of the invention will be apparent form the following more particular description of the preferred embodiment of the invention, as illustrated in the accompanying drawings.

THE DRAWING

THE ASSOCIATIVE MEMORY OF THE DRAWING

Introduction

Figure 1:
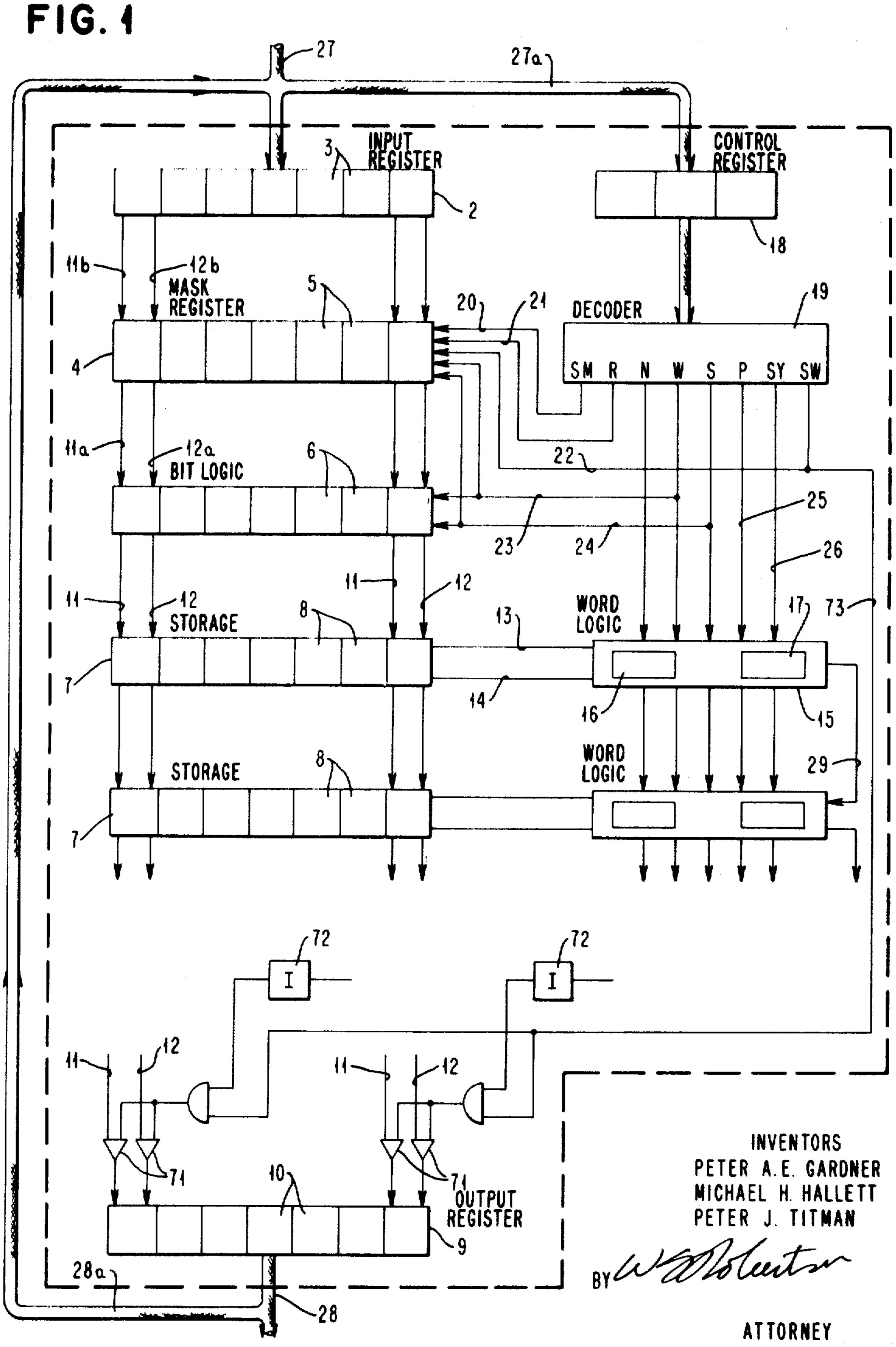
FIG. 1 is a schematic diagram of an associative memory according to the invention.

The associative memory shown in FIG. 1 comprises an input register 2 including a plurality of binary storage cells 3, a mark register 4 comprising the same number of mask circuits 5 as there are storage cells 3 in the output register 2, a plurality of bit logic circuits 6, one to each mask position, a plurality of word locations 7, each comprising as many data storage cells 8 as there are bit logic circuits, and an output register 9 including binary storage cells 10. The memory may be considered as comprising a plurality of columns, each column comprising an input binary storage cell 3, a mask circuit 5, a bit logic circuit 6, as many data storage cells 8 as there are word stores 7, and an output binary storage cell 10. The elements of each column are connected through two bit lines 11 and 12, called respectively the 0 and the 1 bit line. The 0 line 11 carries signals representing a binary 0 and the 1 bit line 12 carries signals representing a binary 1. As will be explained later, the bit lines have triple input/output/interrogation functions and the signal level varies according to the function. For clarity, only the bit lines of the outer columns of the memory have been shown in FIG. 1. Connected to each word store through a word collector line 13 and word emitter line 14 is a word logic circuit 15 which includes a primary trigger 16 and a secondary trigger 17.

Operation of the memory of FIG. 1 is controlled by the contents of a separate multidigit control register 18 the output of which is analyzed by a decoder 19 which generates control signals on lines 20 to 26 and 73 which are connected between the decoder 19, the mask register 4, the bit logic circuits 6, and the word logic circuits 14. Data is transmitted to the memory on an input bus 27, which has a branch 27*a* connected to control register 18, and is transmitted from the memory on an output bus 28 which has a branch 28*a* connected to input bus 27.

As the memory is shown in FIG. 1, the control register 18 is distinct from input register 2 and the memory is externally controlled. It is possible, however, that each word can contain a control field which determines the operation to be performed on the data of the word, including the control field, thereby making the memory independent of external control.

The Data Storage Cell

In an associative memory a data storage cell has the facility of nondestructively indicating whether the data content of the cell matches or does not match a binary value represented by an interrogating signal. Associative cells having such properties are well known and have comprised semiconductor circuits, cryotrons, and magnetic cores. Any known type of associative cell may be used to provide the data storage cells 8 but it is preferred to use the cell in FIG. 2 of the drawings which is described and claimed in our copending application Ser. No. 740,939, now U.S. Pat. No. 3,543,296, issued Nov. 24, 1970.

Figure 2:
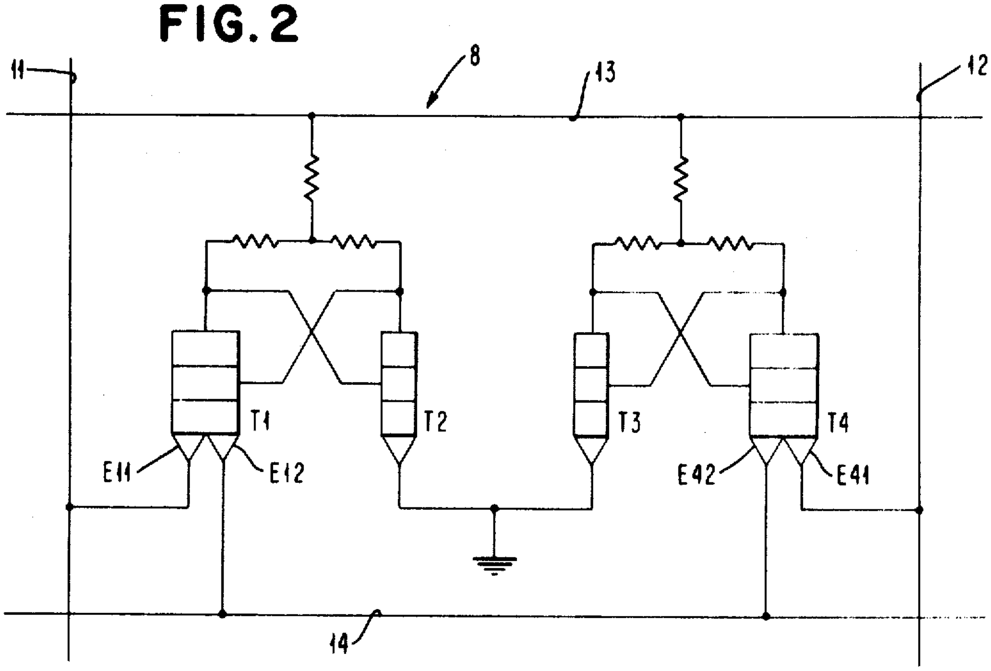
FIG. 2 is a circuit diagram of the preferred data storage cell.

The data cell of FIG. 2 is a multistable transistor circuit comprising two bistable circuits T1, T2 and T3, T4 respectively. Transistors T1 and T4 are double emitter transistors. Each stable state of the circuit is defined by one transistor of each bistable circuit being conductive. Three stable states are used in the memory of FIG. 1: when transistors T1 and T3 are conductive, the cell is storing a binary 0 (is in the 0 state); when transistors T2 and T4 are conductive, the cell is storing a binary 1 (is in the 1 state); and when transistors T2 and T3 are conductive, the cell is in a stable state which will be referred to as the X state. In order to interrogate the cell without changing its state, predetermined voltages are placed on the bit lines 11 and 12 by the bit logic circuit 6 (FIG. 1) connected to the bit lines. To interrogate for the 1 state, a high voltage relative to some reference voltage, for example ground, is placed on bit line 11 and low voltage is placed on bit line 12. If transistor T4 is conducting current is steered, due to the high voltage on bit line 11, through emitter E41 to bit line 12, substantially none reaching word emitter line 14 through emitter E42. If transistor T1 is conducting, current is steered, due to the high voltage on bit line 11, through emitter 12 to word emitter line 14. It follows that if the data cell is in the 1 state, no current appears on line 14, indicating a match, whereas if the data cell is in the 0 state, current appears on line 14, indicating no match. Interrogation for the 0 state is effected by placing a high voltage on bit line 12 and a low voltage on bit line 11. In similar fashion to interrogation for the 1 state, if the cell is in the 0 state no current appears on line 14, indicating a match, whereas if the cell is in the 1 state current appears on line 14, indicating no match. A significant feature of the cell of FIG. 2 is the response of the cell to interrogation for either the 1 or 0 states, when the cell is in the X state. In the X state transistors T2 and T3 are conductive and whatever the interrogation signals no current appears on line 14. In the X state, therefore, the response to any interrogation is a match signal. This feature provides great flexibility in the use of an associative memory; by contrast with conventional two state associative cells the state of every interrogated cell is significant in determining the result of the interrogation. With associative cells capable of storing the X state, it is possible, for example, simultaneously to interrogate different fields in different words to perform table-lookup and similar operations.

To read the state of the data cell, the voltage on the word emitter line 14 is raised. If transistors T1 or T4 are conductive current is steered through emitter E11 or E41, respectively, onto the bit line 11 or 12 respectively. If the cell is in the X state no current appears on either bit line. To write into the data cell the voltage on word emitter line 14 is raised, and the voltage on the word collector line is lowered. Voltages on the bit lines 11 and 12 of the same values as used for interrogation are, under these conditions, sufficient to switch the states of the bistable circuits. A high voltage on bit line 11, for example sends or maintains transistor T1 nonconducting, whereas a low voltage on bit line 11 sends or maintains transistor T1 conducting.

The copending application referred to above describes several variants of the data cell illustrated in FIG. 2, any of which are suitable for incorporation in an associative memory according to the invention.

Summary of Operation

A summary of the basic operations which are performed in the memory will be a helpful introduction to a detailed description of other components of the memory.

a. Select Primary, Select Secondary. The binary digits in those orders of the input register 2 which are not masked by the mask register 4 are compared with the binary digits in corresponding orders of all the words 7. A match occurs if a data storage cell 8 is storing the same digit as the correspondingly ordered cell 3 or is in the X state. The word emitter line 14 is common to all data cells 8 of a word 7, so that a no match with any cell of a word results in a no match indication for the word. Each masking circuit 5, as will be described below, contains a bistable circuit, called a mask trigger, having 1 and 0 stable states. In a select operation a comparison takes place only in those orders of the word stores for which the mask trigger is in the 1 state. Those words which issue a match signal, i.e. no current on the associated word emitter line 14, cause the primary trigger 16, or the secondary trigger 17, to be set according to whether the operation is a Select Primary or Select Secondary, respectively.

b. Read Primary, Read Secondary. The contents of the words of which the primary or secondary trigger, according to the operation, is set, are read out to the output register 9. Only those orders of the stores for which the mask trigger is in the 0 state are read out. If more than one primary or secondary trigger is set, the operation is effectively an OR operation on the contents of those words stores for which the trigger is set into the output register. The state of the primary or secondary triggers is not changed.

c. Write Primary, Write Secondary. The contents of the input register in those orders for which the mask trigger is in the 0 state are written into word locations for which the primary or secondary trigger, according to the operation, set. The state of the primary or secondary trigger is not changed.

d. Select Next Primary, Read Primary. Select Next Secondary, Read Secondary. In the first part of this operation any set primary or secondary triggers, as required, are reset and the primary or secondary trigger of the next word store is set. The next store is defined as the adjacent store in a given direction. In FIG. 1, the trigger of the next lower word is set and the connection between adjacent word logic circuits 15 for this purpose is indicated schematically by the control lines 29. The second part of the operation is the same as the Read Primary or Secondary operation described above. The commonest use of this operation is in stepping through a set of consecutive instructions.

e. Switch Primary, Switch Secondary. This operation is identical to the Select Next Primary (Secondary), Read Primary (Secondary) operation except that the setting of the mask register is ignored. The effect of the operation is to read out the next word to a currently selected word. One use of this instruction is to initiate a branch from a set of instructions.

f. Switch Primary and Set Mask, Switch Secondary and Set Mask. This is the same as the Switch operation (e) but instead of being read out to the output bus the result is copied into the triggers of the mask register.

The Bit Logic Circuit

Figure 3:
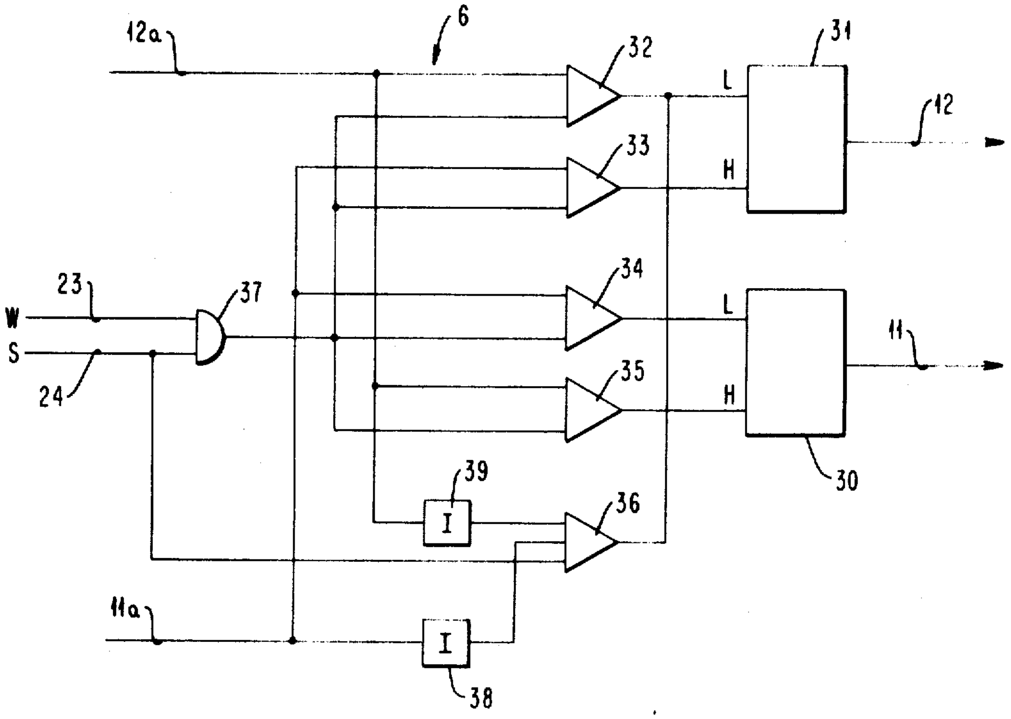
FIG. 3 is a schematic diagram of a bit logic circuit of the memory of FIG. 1.

FIG. 3 shows a bit logic circuit 6. The requirements for the circuitry are that if a read operation is to be performed, the bit lines 11 and 12 to the data storage cells 8 should be at a suitable reference voltage such as ground; if the operation is a select operation in which the cell is to be interrogated for the 1 state, or is a write operation to write 1 into the cell, the bit line 11 should be at a high voltage relative to the reference potential and the bit line 12 should be at a low voltage relative to the reference potential; and if the operation is a select operation in which the cell is to be interrogated for the 0 state or is a write operation to write 0 into the cell, the bit line 11 should be at a high voltage relative to the reference potential and the bit line 12 should be at a low voltage relative to the reference potential. The operation to be performed is determined by control signals on lines 23 and 24 from the decoder 19 and whether a 1 or 0 bit is involved is determined by the state of the corresponding cell 3 of the input register. Accordingly, the bit driver 6 comprises bit line driver circuits 30 and 31, the outputs of which are connected to the bit lines 11 and 12 respectively. Each bit driver has two inputs, referenced H and L, respectively. If an input H is activated the output of the bit driver is at a high voltage relative to the reference potential, if an input L is activated the output of the bit driver is at a low potential relative to the reference potential, and if neither input is activated the output of the bit driver is at reference potential. Activation of the inputs H, L is effected by means of AND circuits 32 to 36. One input to each of the AND circuits 32 to 35 is the output of OR circuit 37 which has as inputs the lines 23 and 24 from decoder 19. Line 23 is energized when a select (S) operation is required. Line 24 is also connected as one input to AND circuit 36. The outputs **11*a* and 12*a* of a cell 3 of input register 2 provide the other inputs to AND circuits 32 to 36. Line 11*a* is energized if the cell 3 is storing a binary 0 and line 12*a* is energized if the cell is storing a binary 1. Line 11*a* is connected as input to AND circuits 33 and 34, and, through inverter 38, to AND circuit 36. Line 12*a* is connected as input to AND circuits 32 and 35, and, through inverter 39 to AND circuit 36. The outputs of AND circuits 32 and 34 are respectively connected to the respective inputs L of bit line driver circuits 30 and 31. The output of AND circuits 33 and 35 are respectively connected to the respective inputs H and the output of AND circuit 36** is connected to both L inputs.

The Mask Circuit

Figure 4:
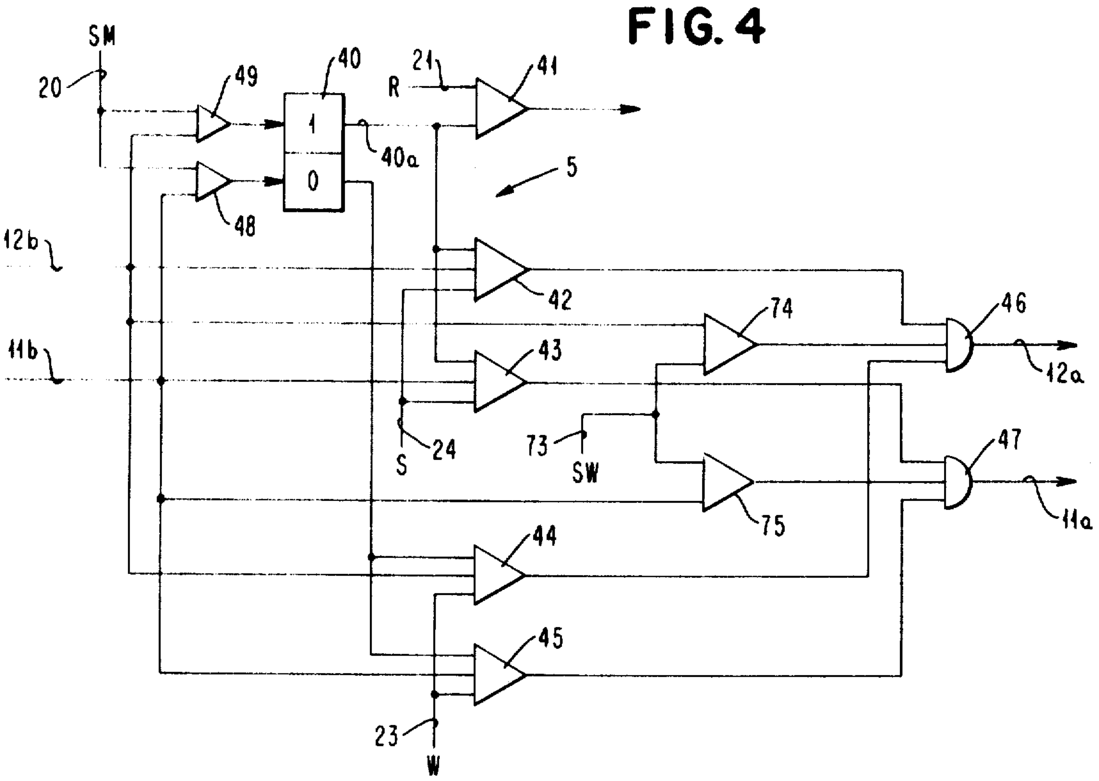
FIG. 4 is a schematic diagram of a mask circuit of the memory of FIG. 1.

A typical mask circuit of the mask register 4 is shown in FIG. 4. Each mask circuit includes a mask trigger 40 which determines if the signals on bit lines 11*b*, 12*b* from the input register are to be transmitted on the bit lines 11*a*, 12*a*, to the bit logic circuit 6. The output 40*a* of trigger 40, which is energized when the trigger is in the 1 stable state, is connected as input to AND circuits 41, 42, and 43, and the output 40*b* of trigger 40, which is energized when the trigger is in the 0 stable state is connected as input to AND circuits 44 and 45. The 0 bit line 11*b* from the input register 2 is connected as input to AND circuits 43 and 45, and 1 bit line 12*b* from the input register 2 is connected as input to AND circuits 42 and 44. The Select line 24 from decoder 19 is connected as input to AND circuits 44 and 45, and the Read line 21 is connected as input to AND circuit 41. The outputs of AND circuits 42 and 44 are connected as inputs to OR circuit 46, the output of which is bit line 12*a*, and the outputs of AND circuits 43 and 45 are connected as input to OR circuit 47, the output of which is the bit line 11*a*. The bit lines 11*b*, 12*b* are respectively connected as inputs to respective AND circuits 48 and 49. The Set Mask line 20 from decoder 19 is also connected as an input to each of AND circuits 48 and 49.

The Word Logic Circuit

Figure 5:
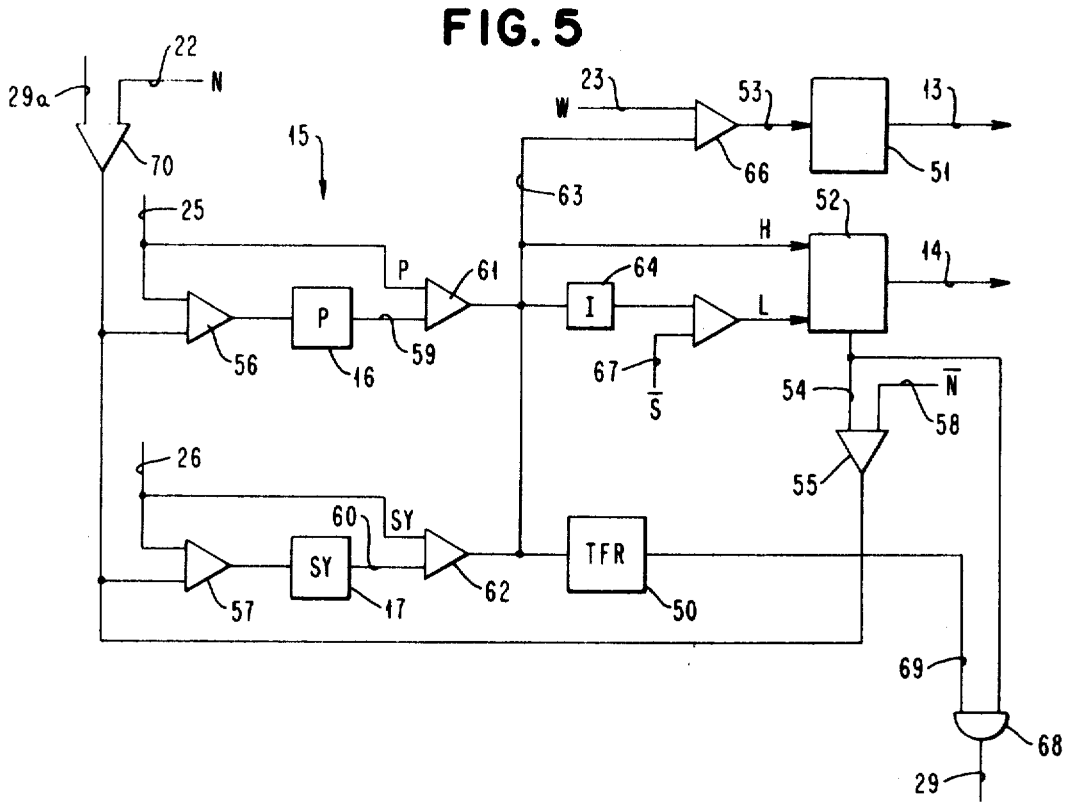
FIG. 5 is a schematic diagram of a word logic circuit of the memory of FIG. 1.

A typical word logic circuit 15 is shown in FIG. 5. The circuit includes primary trigger 16, secondary trigger 17, a transfer trigger 50, a line driver 51 for the word collector line 13 and a line driver 52 for the word emitter line 14. Line driver 51 is so constructed that the voltage on word collected line 13 is normally at a first higher value suitable for the operations of read and select on the data cells 8 to which line 13 is connected, but when input 53 is energized the voltage in line 13 drops to a second lower value suitable for a write operation on the data cells. Line driver 52 is similar in function to the drivers 30, 31 of the bit logic circuits. When input H is energized line 14 is at a high voltage relative to a reference voltage, when input L is energized line 14 is at a low voltage relative to a reference voltage, and when neither input is energized line 14 is at the reference voltage. Line driver 52 differs from drivers 30, 31 (FIG. 3) in that the former is arranged to sense the presence or absence of current on line 14. It will be recalled that current on line 14 indicates no match between the contents of data cells connected to line 14 and the contents of the input register, whereas the absence of current indicates a match. Accordingly, line driver 52 is arranged to energize an output line 54 in the absence of current on line 14 when both H and L inputs are not energized. Line 54 is connected through AND circuit 55 and respective AND circuits 56 and 57 to the set inputs of primary trigger 16 and secondary trigger 17. AND circuit 55 has a second input 58 which is energized when the Next line 22 from decoder 19 is not energized. AND circuit 56 has an input connected to the Primary output line 25 from decoder 19, and AND circuit 57 has an input connected to the Secondary output line 27 from decoder 19. The set outputs 59, 60 respectively, of the primary and secondary triggers are energized consequent on energization of the inputs to the triggers and are connected through respective AND circuits 61, 62 to a line 63. AND circuit 61 also has as input the Primary output line 25 from decoder 19, and AND circuit 62 also has as input the Secondary output line 26 from decoder 19.

Line 63 is connected to the set input of transfer trigger 50, the H input of line 52, the L input of line driver 52 through inverter 64 and AND circuit 65, and to the input 53 of line driver 51 through AND circuit 66. AND circuit 65 also has an input line 67 which is energized when Select output line 24 from decoder is not energized. The effect of the arrangement including inverter 64 and AND circuit 65 is to energize input L of line driver if input H is not energized, except when a select operation is being performed. AND circuit 66 also has as inout the Write output line 23 from decoder 19.

Output line 54 from line driver 52 is connected as input to OR circuit 68, which also has as input the set output 69 of transfer trigger 50. The output 29 is the Next Out line which is energized for the purpose of selecting the primary or secondary trigger of the adjacent next lower word logic circuit in "-Next" operations. The "Next Out" line of the adjacent next higher word logic circuit is connected, as the "Next In" line 29*a* as input to AND circuit 70, which also has as input the Next output line from decoder 19.

Timing Circuits

In order to simplify the description of a typical associative memory according to the invention, the description of the clocking system has been omitted from the drawing. It will be understood that the construction of a suitable clock and the interpolation of gates controlled by the clock in the memory described with reference to FIGS. 1 to 5 employs only techniques readily available to one skilled in the art of system design. A suitable clock for the described memory generates a time interval having two equal subintervals. In the first subinterval it is arranged that a Select operation takes place resulting in the setting of the Primary or Secondary trigger of a selected word store, or of the word store next to the selected store, or a transfer takes place of the setting of a Primary or Secondary trigger to the corresponding trigger of the next word store. In the second subinterval it is arranged that a Read or Write operation takes place. All memory operations are combinations of the procedures taking place in the two subintervals, although some operations may need more than one time interval for execution.

OPERATION

Select

During a Select operation, the clock ensures, by controlling suitable gates (not shown), that the set outputs of the primary and secondary triggers are not applied to the H inputs of line drivers 52 (FIG. 5). AND circuits 65 prevent the outputs of inverters 64 from reaching the L inputs of the line drivers due to line 67 not being energized. The result is that both the H and L inputs are not energized and the word emitter lines 14 are at reference potential. In a Select operation those orders of the input register 2 corresponding to mask circuits 5 having the mask trigger 40 (FIG. 4) in the 1 stable state are compared with corresponding orders of all the word stores. The output line 24 is energized when a Select operation is required and in consequence AND circuits 42 and 43 in appropriate mask circuits are enabled to pass the signals on lines 11*b* and 12*b* from the input register to the bit logic circuits by way of lines 11*a*, 12*a*, respectively. Referring to the bit logic circuit of FIG. 3, if line 11*a* is marked AND circuits 33 and 34 are energized resulting in bit line 11 being marked with a low voltage by line driver 30 and bit line 12 being marked with a high voltage by line driver 31. If line 12*a* is marked and circuits 32 and 35 are energized resulting in a high voltage on line 11 and a low voltage on line 12. If the masking circuitry operates to prevent either line 11*a* or 12*a* from being marked, AND circuit 36 is energized and both lines 11 and 12 are marked with a low voltage.

The effect on the data storage cells 8 of the signals on lines 11, 12 with line 14 at reference potential has already been described with reference to FIG. 2. If a match signal issues on a word emitter line 14, output line 54 of connected line driver 52 (FIG. 5) is energized. If the operation is Select Primary, output line 25 of decoder 19 is energized, whereas, if the operation is Select Secondary, output line 27 of the decoder is energized, the signal on line 54 sets the primary trigger 16 or the secondary trigger 17 by way of AND circuits 56 or 57.

"Next" Operations

These are operations in which the adjacent next lower word store ("lower" as shown in FIG. 1) is selected by setting, as required, either the primary or secondary trigger of the word logic circuitry associated with the store to be selected. A "-next" operation may involve setting the trigger of the next word store immediately a word store issues a match signal, or may involve the transfer of the setting of the trigger in one word store to the trigger of the next store. In the first case, the Select and Next output lines from decoder 19 are simultaneously energized, together with the Primary line 25 or Secondary line 26 as required. In consequence AND circuit 55 (FIG. 5) is not energized whereas AND circuit 70 is energized. The signal on line 54 from line driver 52 is applied by way of OR circuit 68, the Next Out line 29, and the Next In line 29*a* of the next word store word logic circuit to set the primary or secondary trigger of the next word store. In the case where the setting of a primary or secondary trigger is to be transferred, the Select output is not energized. If a primary or secondary trigger is set, the output of the trigger sets a transfer trigger 50 which energizes a line 69 and thus the Next Out line 29.

Read Operation

For a read operation emitter line 14 should be at a high voltage and bit lines 11 and 12 at the reference voltage. The read operation takes place only on those word stores which have previously been selected by setting the primary or secondary trigger. According as to whether the operation is to involve those word stores having the primary or the secondary trigger set AND gates 61 or 62 of all the word logic circuits are energized in accordance with the output of decoder 19. In those word stores with a set trigger the H input to line driver 52 is energized and line 14 is raised to a high voltage. In the other word stores, since this is not a Select operation AND circuit 65 is energized and line 14 is placed at a low potential, the effect of which is steer on to line 14 any current flowing in transistors T1 and T4 of the associated storage cells 8 (FIG. 2), thereby preventing erroneous signals from appearing on the bit lines. Referring to FIG. 3, it will be seen that none of the AND circuits 32 to 36 are energized during a read operation with the result that the bit lines 11, 12 are at reference potential. Raising the potential on the lines 14 of those words which have been selected diverts any current flowing in transistors T1 and T4 of the cells of the selected words onto the bit lines. The Read operation is thus an OR operation on like orders of selected words, the result appearing in the output register 9. A read operation takes place on only those orders of the words for which the mask trigger 40 is in the 0 stable state. To enable this control to be effected each bit line 11, 12, is connected to the output register 9 through a respective AND circuit 71 (FIG. 1). The AND circuits 71 to which each pair of bit lines are connected have a common input from an inverter 72 which is driven by the output of AND circuit 41 in the corresponding masking circuit 5 (FIG. 4). AND circuit 41 is energized when trigger 40 is in the 1 stable state and when a Read operation is taking place. The effect of the arrangement just described is that data read onto the bit lines 11, 12 is gated to the output register only in those orders for which the mask is 0.

Write Operations

For a write operation the voltages to be applied to the bit lines 11 and 12 are the same as those required for a Select operation. When it is not required to Write data into a word cell, the bit lines are held at reference potential. No provision need be made for this case, as for example by the AND circuit 36 (FIG. 3) for the Select operation, since, if neither input to the line drivers 30, 31 is energized, the outputs are at reference potential. For a write operation, the word collector line 13 potential should be lowered and the word emitter line 14 potential should be raised. In selected words the output of the set primary or secondary trigger is applied to the H input of line driver 52 and through AND circuit 66, energized by the Write output line 23 of decoder 19, to the input 53 of line driver 51. In unselected words, the L input to line driver 52 is energized as in a read operation, hereby effectively isolating these words from the bit lines by ensuring that signals on the bit lines have no effect on the data cells comprising the unselected words.

Switch Operations

These operations involve combinations of the Select Next, and Read Operations described above but with the proviso that the setting of the mask register is ignored. For a switch operation, a Switch line 73 from decoder 19 (FIG. 1) is connected to the AND circuits 71 so as to override the effect of the mask register during readout, and is also connected to AND circuits 74 and 75 in each mask circuit 5 (FIG. 4) so that during a Switch operation bit lines 11*b*, 12*b* are connected respectively to the bit lines 11*a*, 12*a*, no matter what the setting of the mask trigger 40. A switch operation may also involve setting the mask register, which comprises reading a selected word into the mask triggers 40. When the Set Mask output line 20 from decoder 19 is energized, AND circuits 48 and 49 are activated to connect bit lines 11*b*, 12*b* to the inputs of mask trigger 40. Suitable gating means (not shown) under the control of Set Mask line 20 are provided to direct data by way of bus 28*a* (FIG. 1) from the output register 9 to the input register 2 where it marks the bit lines 11*b*, 12*b*.

From the above description of the basic operations Select, Read, Write, Next and Switch, it can be seen that a variety of operations can be devised using a clocking system having the two subintervals mentioned, although an operation may require more than one clock interval for its execution.

While the invention has been particularly shown and described with reference to preferred embodiments thereof, it will be understood by those skilled in the art that the foregoing and other changes in form and details may be made therein without departing from the spirit and scope of the invention.

What is claimed is;

1. An associative memory of the type having means for comparing bit positions of words of the memory with predetermined bit values and producing for each word a signal signifying a relationship between the word and said predetermined bit values, wherein the improvement comprises,
   for each word a plurality of means to store said signals and separate selection means for enabling a selected one of said signal storing means to receive said signal.

2. An associative memory as defined in claim 1, wherein the selection means includes means to set to the predetermined state a selected device of the plurality associated with a word location adjacent a word generating the signal.

3. An associative memory as defined in claim 1, including accessing means for transferring data from any word location marked by having a selected device of the associated plurality in a predetermined stable state to an output register and from an input register to any marked word store.

4. An associative memory as defined in claim 3, including a multiorder mask register, each order of which includes means to determine if, upon operation of the comparison means, a comparison is to take place between data of the same order of the input register and of the words and if, upon operation of the accessing means, a data transfer is to take place between the same order of any marked word store and of the input or output registers.

5. An associative memory as defined in claim 4, in which each order of the mask register includes a mask trigger and includes means for preventing, upon operation of the comparison means, comparison between the same order of the input register and of the word stores if the mask trigger is in one stable stage, and for preventing, upon operation of the accessing means, data transfer between the same order of any marked word store and of the input or output register if the trigger is in the other bistable stable.

6. An associative memory as defined in claim 4 including means for rendering the mask register ineffective to control comparison or accessing of data in the word stores.

7. An associative memory as defined in claim 6, with means for transferring data from any marked word store to the mask triggers.

8. An associative memory as defined in claim 1 in which each order of each word comprises a data storage cell having three stable states, a first stable state representing a binary zero, a second stable state representing a binary one, and a third stable state which is such as not to prevent generation of the match signal by the word store upon operation of the comparison means whatever the data content of the corresponding order of the input register.